US006671150B2

(12) United States Patent
Elms et al.

(10) Patent No.: US 6,671,150 B2
(45) Date of Patent: Dec. 30, 2003

(54) CIRCUIT BREAKER FOR DETECTING AN EXCESSIVE VOLTAGE AND TRIPPING RESPONSIVE THERETO

(75) Inventors: Robert Tracy Elms, Monroeville, PA (US); Thomas Edward Natili, Butler, PA (US)

(73) Assignee: Eaton Corporation, Cleveland, OH (US)

( * ) Notice: Subject to any disclaimer, the term of this patent is extended or adjusted under 35 U.S.C. 154(b) by 211 days.

(21) Appl. No.: 10/036,277

(22) Filed: Nov. 7, 2001

(65) Prior Publication Data

US 2003/0086224 A1 May 8, 2003

(51) Int. Cl.[7] .............................. H02H 3/20; H02H 3/00
(52) U.S. Cl. ........................................ 361/91.1; 361/42
(58) Field of Search ................ 361/42–50, 88, 361/91.1, 93.1, 93.4, 93.9, 100, 102, 115, 118, 133–136; 335/6–8, 10, 12, 14, 17, 18, 20

(56) References Cited

U.S. PATENT DOCUMENTS

| | | |
|---|---|---|
| 5,224,006 A | 6/1993 | MacKenzie et al. |
| 5,260,676 A | 11/1993 | Patel et al. |
| 5,293,522 A | 3/1994 | Fello et al. |
| 5,459,630 A | 10/1995 | MacKenzie et al. |
| 5,519,368 A | 5/1996 | Heise et al. |
| 5,541,800 A | 7/1996 | Misencik |
| 5,691,869 A | 11/1997 | Engel et al. |
| 5,875,087 A | 2/1999 | Spencer et al. |
| 5,917,686 A | 6/1999 | Chan et al. |
| 6,057,997 A | 5/2000 | Mackenzie et al. |
| 6,141,197 A * | 10/2000 | Kim et al. .................. 361/93.5 |
| 6,477,022 B1 * | 11/2002 | Ennis et al. .................... 361/42 |
| 6,552,884 B2 * | 4/2003 | Kim et al. ..................... 361/42 |
| 6,577,478 B2 * | 6/2003 | Kim et al. ..................... 361/42 |

\* cited by examiner

Primary Examiner—Matthew V. Nguyen
(74) Attorney, Agent, or Firm—Martin J. Moran

(57) ABSTRACT

A circuit breaker includes a line terminal adapted to receive a line voltage having a nominal voltage value and an excessive voltage value, a load terminal, one or more neutral terminals, and separable contacts electrically connected between the line and load terminals. An operating mechanism opens and closes the separable contacts. A trip circuit cooperates with the operating mechanism to trip open the separable contacts. The trip circuit includes a solenoid having a trip coil with a threshold voltage for energization, a circuit adapted to detect an arc fault or ground fault trip condition and to responsively energize the trip coil with the line voltage, and a MOV adapted to detect an excessive voltage condition associated with the load and neutral terminals and to responsively energize the trip coil with at least the threshold voltage.

20 Claims, 3 Drawing Sheets

CIRCUIT BREAKER FOR DETECTING AN EXCESSIVE VOLTAGE AND TRIPPING RESPONSIVE THERETO

BACKGROUND OF THE INVENTION

1. Field of the Invention

This invention relates to electrical switching apparatus and, more particularly, to circuit breakers, such as, for example, arc fault and/or ground fault circuit breakers.

2. Background Information

Circuit breakers are generally old and well known in the art. Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

In many applications, a circuit breaker may provide ground fault protection. Typically, an electronic circuit detects leakage of current to ground and generates a ground fault trip signal. This trip signal energizes a shunt trip solenoid, which unlatches the operating mechanism, typically through actuation of the thermal-magnetic trip device.

A common type of ground fault detection circuit is the dormant oscillator detector including first and second sensor coils. The line and neutral conductors of the protected circuit pass through the first sensor coil. The output of this coil is applied through a coupling capacitor to an operational amplifier followed by a window comparator having two reference values. A line-to-ground fault causes the magnitude of the amplified signal to exceed the magnitude of the reference values and, thus, generates a trip signal. At least the neutral conductor of the protected circuit passes through the second sensor coil. A neutral-to-ground fault couples the two detector coils which causes the amplifier to oscillate, thereby resulting in the generation of the trip signal. See, for example, U.S. Pat. Nos. 5,260,676; and 5,293,522.

Recently, there has been considerable interest in also providing protection against arc faults. Arc faults are intermittent high impedance faults which can be caused, for instance, by worn insulation between adjacent conductors, by exposed ends between broken conductors, by faulty connections, and in other situations where conducting elements are in close proximity. Because of their intermittent and high impedance nature, arc faults do not generate currents of either sufficient instantaneous magnitude or sufficient average RMS current to trip the conventional circuit breaker. Even so, the arcs can cause damage or start a fire if they occur near combustible material. It is not practical to simply lower the pick-up currents on conventional circuit breakers, as there are many typical loads, which draw similar currents and would, therefore, cause nuisance trips. Consequently, separate electrical circuits have been developed for generating an arc fault trip signal to respond to arc faults. See, for example, U.S. Pat. Nos. 5,224,006; and 5,691,869. The arc fault trip signal energizes a shunt trip solenoid, which unlatches the operating mechanism, typically through actuation of the thermal-magnetic trip device.

Metal oxide varistors (MOVs) are electrically connected line-to-neutral in miniature arc fault circuit interrupter (AFCI) and/or ground fault circuit interrupter (GFCI) circuit breakers having, for example, one or two poles.

For example, U.S. Pat. No. 5,293,522 discloses a trip circuit for a single-pole circuit breaker including a line-to-neutral varistor, and a varistor for the trip circuit silicon controlled rectifier (SCR).

U.S. Pat. No. 5,260,676 discloses a trip circuit for a two-pole circuit breaker including two line-to-neutral varistors, and a varistor for the trip circuit SCR.

It is known to employ a MOV in parallel with the trip circuit SCR and in series with the solenoid trip coil in the trip circuit of AFCI and/or GFCI circuit breakers, and a MOV between the load and neutral terminals of such breakers. For a miniature circuit breaker, which is rated for operation at 110–120 $VAC_{RMS}$, it is believed that such MOVs are rated at 150 $V_{RMS}$.

U.S. Pat. No. 5,519,368 discloses a ground fault circuit including a coil assembly, a rectifier, a MOV and an SCR in parallel with the MOV. For a 120 $V_{RMS}$ line voltage, the rating of the MOV is 150 $V_{RMS}$.

If the neutral is "lost" (e.g., due to an electrical problem; due to a "white" neutral wire being disconnected from the power bus) in a single-pole, two-pole or three-phase power system, then the line-to-neutral voltage may rise to 208 or 240 $V_{RMS}$, thereby causing the line-to-neutral MOV(s) in a circuit breaker to fail (i.e., due to an excessive voltage condition of sufficient duration).

There is room for improvement in circuit breakers and trip circuits for circuit breakers.

SUMMARY OF THE INVENTION

The present invention is directed to a circuit breaker, which employs an excessive voltage detection circuit, such as an MOV, across the circuit breaker trip circuit, such as from the trip solenoid coil to a power conductor (e.g., line or neutral), rather than from line-to-neutral. This permits the trip solenoid to block high voltage surges during surge testing and, also, to trip the circuit breaker if a sufficient line-to-neutral voltage of suitable duration is applied to the circuit breaker.

As one aspect of the invention, a circuit breaker comprises a line terminal adapted to receive a line voltage having a nominal voltage value and an excessive voltage value; a load terminal; at least one neutral terminal; separable contacts electrically connected between the line terminal and the load terminal; an operating mechanism for opening and closing the separable contacts; and a trip circuit cooperating with the operating mechanism to trip open the separable contacts, the trip circuit comprising an electromagnetic assembly including a trip coil having a threshold voltage for energization, a first circuit adapted to detect a trip condition associated with the separable contacts and to responsively energize the trip coil with the line voltage, and a second circuit adapted to detect an excessive voltage condition associated with the load terminal and the at least one neutral terminal and to responsively energize the trip coil with at least the threshold voltage.

Preferably, the excessive voltage condition is about √3 times to about two times the nominal voltage value The nominal voltage value may be about 110 $V_{RMS}$ to about 120 $V_{RMS}$; the trip threshold voltage of the trip coil may be about 60 $V_{RMS}$; the excessive voltage condition may be about 208 $V_{RMS}$ to about 240 $V_{RMS}$; and the second circuit may have a threshold voltage of about 130 $V_{RMS}$, in order to responsively energize the trip coil with a voltage greater than the threshold voltage.

The second circuit may be a metal oxide varistor or a sidac.

The first circuit may include a fault detection circuit and a silicon controlled rectifier having a gate triggered by the fault detection circuit to energize the trip coil. The second circuit may include a series combination of a diode, a zener diode and a first resistor, with the series combination of the diode, the zener diode and the first resistor being electrically connected in parallel with the silicon controlled rectifier, and with a second resistor being electrically interconnected between the gate of the silicon controlled rectifier and the first resistor.

As another aspect of the invention, a circuit breaker comprises: first and second line terminals; first and second load terminals; at least one neutral terminal; first separable contacts electrically connected between the first line terminal and the first load terminal; second separable contacts electrically connected between the second line terminal and the second load terminal; an operating mechanism for opening and closing the first and second separable contacts; and a trip circuit cooperating with the operating mechanism to trip open the first and second separable contacts, the trip circuit comprising an electromagnetic assembly including a first trip coil, a second trip coil, a first circuit adapted to detect a trip condition associated with at least one of the first and second separable contacts and to responsively energize the first and second trip coils, a second circuit adapted to detect an excessive voltage condition associated with the first load terminal and the at least one neutral terminal and to responsively energize the first trip coil, and a third circuit adapted to detect an excessive voltage condition associated with the second load terminal and the at least one neutral terminal and to responsively energize the second trip coil.

The second and third circuits may be metal oxide varistors or sidacs.

The first circuit may include a fault detection circuit, three pairs of first and second diodes, and a silicon controlled rectifier having an anode, a cathode and a gate triggered by the fault detection circuit, with each of the first and second diodes having an anode and a cathode, with the anodes of the first diodes being electrically connected to define a first node, with the cathodes of the second diodes being electrically connected to define a second node, with the three pairs of diodes defining a third node, a fourth node and a fifth node, respectively. The first trip coil may be electrically connected between the first load terminal and a first one of the third, fourth and fifth nodes. The second trip coil may be electrically connected between the second load terminal and a second one of the third, fourth and fifth nodes. The at least one neutral terminal may be electrically interconnected with a third one of the third, fourth and fifth nodes. The second circuit may be electrically connected between the at least one neutral terminal and the first one of the third, fourth and fifth nodes. The third circuit may be electrically connected between the at least one neutral terminal and the second one of the third, fourth and fifth nodes.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to miniature one- and two-pole circuit breakers for use in residential applications. It will also become evident that the invention is applicable to other types of circuit breakers including those used in AC systems operating at various frequencies and having any number of phases (e.g., one, two, three or more); to larger or smaller circuit breakers, such as subminiature or commercial circuit breakers; and to a wide range of circuit breaker applications, such as, for example, residential, commercial, industrial, aircraft, aerospace, and automotive. As further non-limiting examples, both AC (e.g., 110–120, 220, 480–600 $VAC_{RMS}$) operation at a wide range of frequencies (e.g., 50, 60, 120, 400 Hz) and DC operation (e.g., 42 VDC) are possible.

Figure 1:
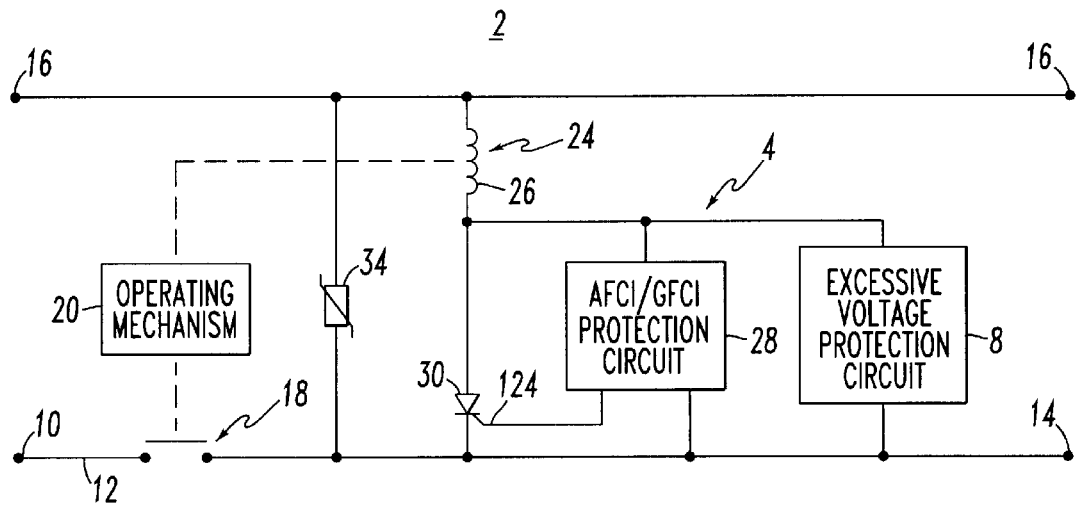
FIG. 1 is a block diagram in schematic form of a trip circuit and an excessive voltage protection circuit for a single-pole circuit breaker in accordance with the present invention.

Referring to FIG. 1, a single-pole circuit breaker 2 includes a trip circuit 4 having an excessive voltage protection circuit 8. A line terminal 10 is adapted to receive a line voltage 12 having a nominal voltage value (e.g., about 110–120 $VAC_{RMS}$) and an excessive voltage value (e.g., resulting from a "lost" neutral condition; about 208 to 240 $VAC_{RMS}$; about √3 times to about two times the nominal value of the line voltage 12). The circuit breaker 2 also includes a load terminal 14, and one or more neutral terminals 16 (two are shown in FIG. 1). Separable contacts 18 are electrically connected between the line terminal 10 and the load terminal 14. As is well known, an operating mechanism 20 opens and closes the separable contacts 18.

The circuit breaker trip circuit 4 cooperates with the operating mechanism 20 to trip open the separable contacts 18. The trip circuit 4 includes an electromagnetic assembly, such as a solenoid 24 having a trip coil 26 with a trip threshold voltage for tripping. A first circuit, such as the AFCI/GFCI protection circuit 28, is adapted to detect an arc fault and/or ground fault trip condition associated with the separable contacts 18 in the power circuit between the line and load terminals 10,14, and to responsively energize the trip coil 26 with the line voltage through SCR 30, as is well known.

In accordance with the present invention, a second circuit, which is the excessive voltage protection circuit 8, is adapted to detect an excessive voltage condition through trip coil 26 associated with the load and neutral terminals 14,16 and to responsively energize the trip coil 26 with at least the threshold voltage thereof.

In the exemplary embodiment, the nominal value of the line voltage 12 is about 110 $V_{RMS}$ to about 120 $V_{RMS}$, the threshold voltage of the trip coil 26 is about 60 $V_{RMS}$, and the excessive voltage condition is about 208 $V_{RMS}$ to about 240 $V_{RMS}$ (i.e., about √3 times the value of the line voltage 12). For example, if the excessive voltage protection circuit 8 is a MOV having a rated voltage of about 130 $V_{RMS}$, then such circuit 8 responsively energizes the trip coil 26 with a voltage greater than the threshold voltage of 60 $V_{RMS}$.

Preferably, as shown in FIG. 1, a transient protection device, such as the exemplary MOV 34, is electrically connected between the load and neutral terminals 14,16. In the exemplary embodiment, the nominal value of the line voltage 12 is about 110 $V_{RMS}$ to about 120 $V_{RMS}$, and the MOV 34 has a rated voltage of about 250 $V_{RMS}$. In this manner, the MOV 34 protects the circuit breaker 2 from relatively shorter duration surges and/or transients above about 250 $V_{RMS}$, while the excessive voltage protection circuit 8 trips the circuit breaker 2 responsive to relatively longer duration excessive voltage conditions above about 190 $V_{RMS}$.

Figure 2:
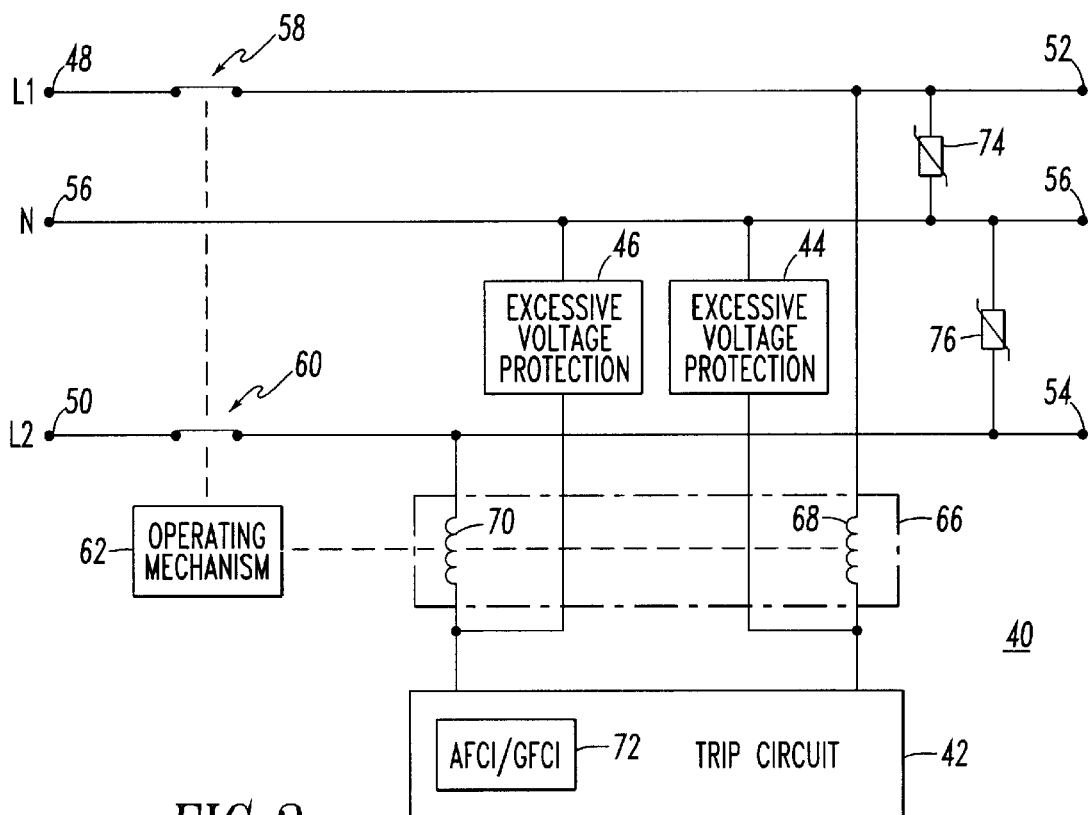
FIG. 2 is a block diagram in schematic form of a trip circuit and two excessive voltage protection circuits for a two-pole circuit breaker in accordance with another embodiment of the present invention.

FIG. 2 shows a two-pole circuit breaker 40 including a trip circuit 42 and two excessive voltage protection circuits 44,46. The circuit breaker 40 includes first and second line terminals 48,50, first and second load terminals 52,54, and one or more neutral terminals 56 (two are shown in FIG. 2). First separable contacts 58 are electrically connected between the first line terminal 48 and the first load terminal 52. Similarly, second separable contacts 60 are electrically connected between the second line terminal 50 and the second load terminal 54. An operating mechanism 62 opens and closes the first and second separable contacts 58,60. The trip circuit 42 cooperates with the operating mechanism 62 to trip open the first and second separable contacts 58,60.

The trip circuit 42 includes an electromagnetic assembly, such as solenoid 66, having a first trip coil 68 and a second trip coil 70. A first circuit, such as AFCI/GFCI circuit 72, is adapted to detect a trip condition associated with one or both of the first and second separable contacts 58,60 and the respective power circuits between the first line and load terminals 48,52 and second line and load terminals 50,54, and to responsively energize the first and second trip coils 68,70. A second circuit, the excessive voltage protection circuit 44, is adapted to detect an excessive voltage condition through first trip coil 68 associated with the first load terminal 52 and the neutral terminal 56 and to responsively energize the first trip coil 68. A third circuit, the excessive voltage protection circuit 46, is adapted to detect an excessive voltage condition through second trip coil 70 associated with the second load terminal 54 and the neutral terminal 56 and to responsively energize the second trip coil 70.

In the exemplary embodiment, the nominal value of the two line voltages between the neutral terminal 56 and the respective load terminals 52,54 is about 110 $V_{RMS}$ to about 120 $V_{RMS}$, and the threshold voltage of the trip coils 68,70 is about 60 $V_{RMS}$. For example, a typical excessive voltage condition is about 208 $V_{RMS}$ to about 240 $V_{RMS}$, as measured from line-to-neutral. As a further example, if the excessive voltage protection circuit 44 is a MOV having a rated voltage of about 130 $V_{RMS}$, then such circuit 44 responsively energizes the first trip coil 68 with a voltage greater than the threshold voltage of 60 $V_{RMS}$. The circuit 46 operates in a similar manner with the trip coil 70.

Preferably, as shown in FIG. 2, transient protection devices, such as the exemplary MOVs 74,76, are electrically connected between the respective load terminals 52,54 and the neutral terminal 56. In the exemplary embodiment, with the nominal value of the line voltage being about 110 $V_{RMS}$ to about 120 $V_{RMS}$, the MOVs 74,76 have a rated voltage of about 250 $V_{RMS}$.

Figure 3:
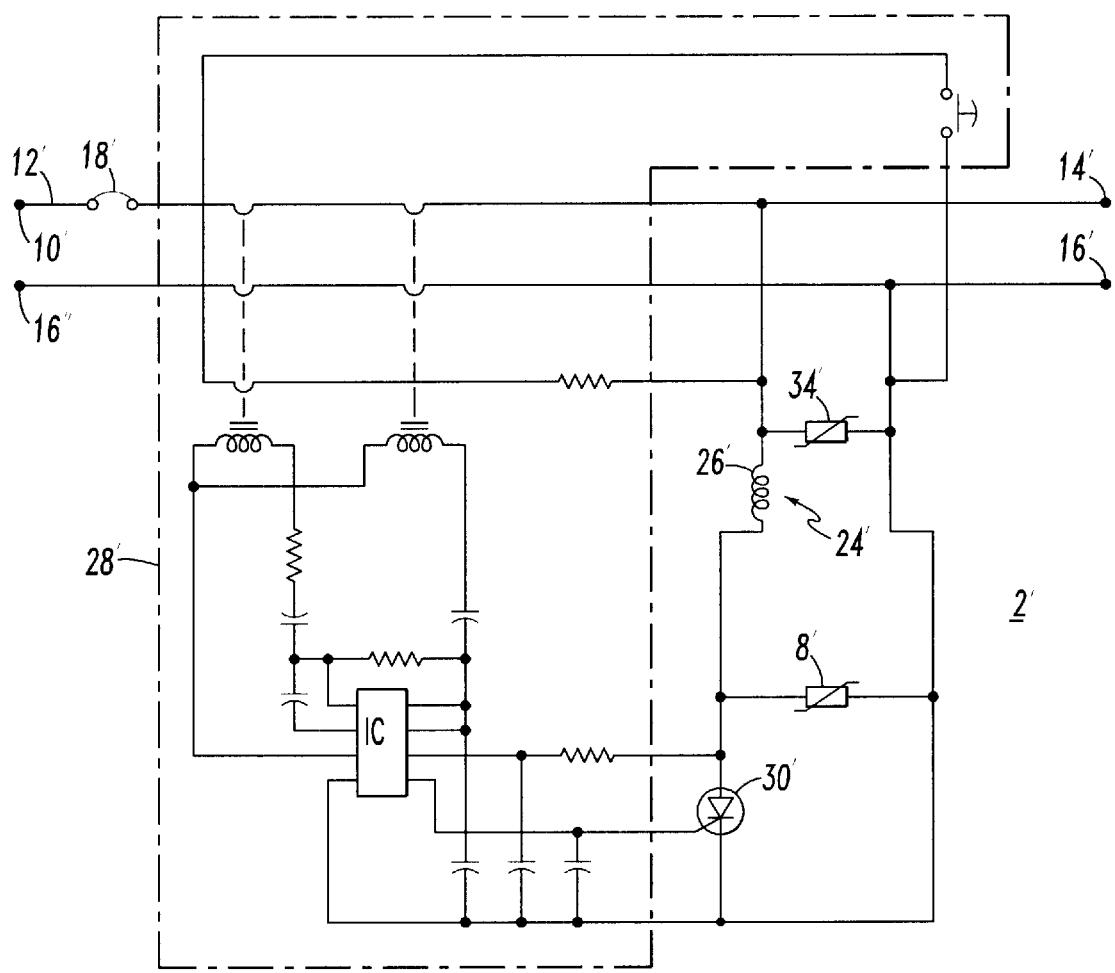
FIG. 3 is a block diagram in schematic form of a trip circuit and an excessive voltage protection circuit for a single-pole circuit breaker in accordance with an another embodiment of the present invention.

FIG. 3 shows another trip circuit 28' and another excessive voltage protection circuit 8' for a single-pole circuit breaker 2'. A line terminal 10' is adapted to receive a line voltage 12' having a nominal value (e.g., about 110–120 $VAC_{RMS}$) and an excessive voltage condition of 208 $V_{RMS}$ to 240 $V_{RMS}$. The circuit breaker 2' also includes a load terminal 14' and a neutral terminal 16' having a neutral pigtail 16" electrically connected thereto. Separable contacts 18' are electrically connected between the line terminal 10' and the load terminal 14'. As is well known, an operating mechanism (not shown) similar to the operating mechanism 20 of FIG. 1 opens and closes the separable contacts 18'.

Unlike the circuit breaker 2 of FIG. 1, the GFCI protection circuit 28' is referenced to the neutral terminal 16', while the AFCI/GFCI protection circuit 28 is referenced to the load terminal 14. Otherwise, the MOV 8', MOV 34', SCR 30', solenoid 24' and trip coil 26' function in a similar manner as the corresponding excessive voltage protection circuit 8, MOV 34, SCR 30, solenoid 24 and trip coil 26 of FIG. 1. SCR 30' is triggered by the GFCI protection circuit 28' to energize the trip coil 26'.

Figure 4:
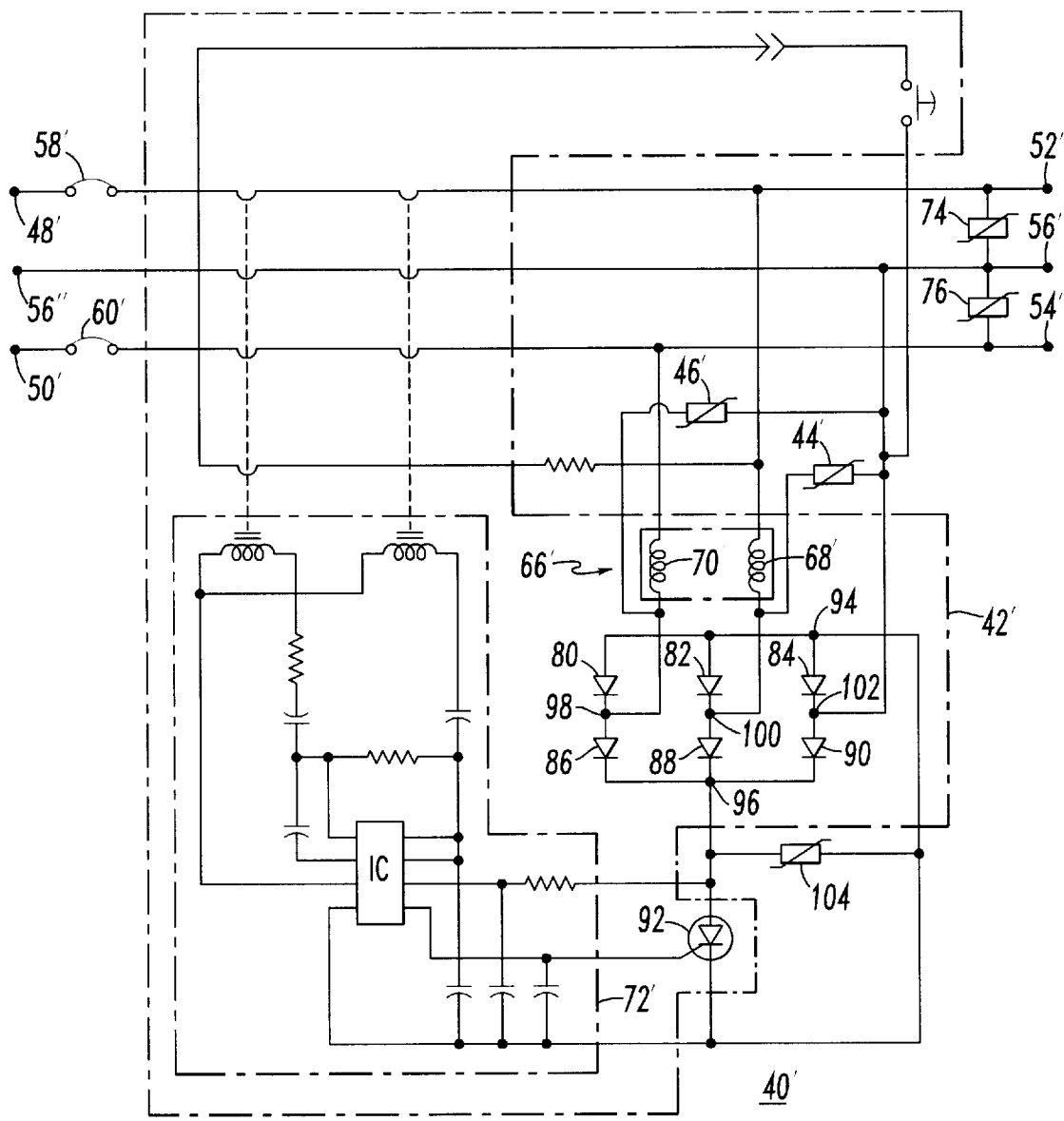
FIG. 4 is a block diagram in schematic form of a trip circuit and two excessive voltage protection circuits for a two-pole circuit breaker in accordance with another embodiment of the present invention.

FIG. 4 shows a two-pole circuit breaker 40' including a trip circuit 42' and two excessive voltage protection circuits 44',46'. The circuit breaker 40' includes first and second line terminals 48',50', first and second load terminals 52',54', and a neutral terminal 56' having a neutral pigtail 56" electrically connected thereto. First separable contacts 58' are electrically connected between the first line terminal 48' and the first load terminal 52'. Similarly, second separable contacts 60' are electrically connected between the second line terminal 50' and the second load terminal 54'. An operating mechanism (not shown) similar to the operating mechanism 62 of FIG. 2 opens and closes the first and second separable contacts 58',60'. The trip circuit 42' cooperates with the operating mechanism to trip open the first and second separable contacts 58',60'.

The trip circuit 42' includes an electromagnetic assembly, such as solenoid 66', having a first trip coil 68' and a second trip coil 70'. A first circuit, such as GFCI circuit 72', is adapted to detect a trip condition associated with one or both of the first and second separable contacts 58',60' and the respective power circuits between the first line and load terminals 48',52' and second line and load terminals 50',54', and to responsively energize the first and second trip coils 68',70'. A second circuit, the excessive voltage protection circuit 44', is adapted to detect an excessive voltage condition through first trip coil 68' associated with the first load terminal 52' and the neutral terminal 56' and to responsively energize the first trip coil 68'. A third circuit, the excessive voltage protection circuit 46', is adapted to detect an excessive voltage condition through second trip coil 70' associated with the second load terminal 54' and the neutral terminal 56' and to responsively energize the second trip coil 70'. Preferably, as shown in FIG. 2, transient protection devices, such as the exemplary MOVs 74,76, are electrically connected between the respective load terminals 52',54' and the neutral terminal 56'.

The trip circuit 42' includes the GFCI fault detection circuit 72', three pairs of first diodes 80,82,84 and second diodes 86,88,90, and a silicon controlled rectifier (SCR) 92 having an anode, a cathode and a gate triggered by the circuit 72'. The anodes of the first diodes 80,82,84 are electrically connected to define a first node 94, and the cathodes of the second diodes 86,88,90 are electrically connected to define a second node 96. The three pairs of diodes also define a third node 98, a fourth node 100 and a fifth node 102, respectively. For example, the node 98 is at the junction of the cathode of diode 80 and the anode of diode 86. The first trip coil 68' is electrically connected between the first load terminal 52' and the node 100, the second trip coil 70' is electrically connected between the second load terminal 54' and the node 98, and the neutral terminal 56' is electrically interconnected with the node 102. The second circuit, MOV 44', is electrically connected between the neutral terminal 56' and the node 100, and the third circuit, MOV 46', is electrically connected between the neutral terminal 56', and the node 98.

The anode of the SCR 92 is electrically connected to the node 96, and the cathode of the SCR 92 is electrically connected to the node 94. The SCR 92 is triggered by GFCI circuit 72' to energize the first and second trip coils 68',70' through the diodes 80,82,84,86,88,90. Preferably, a MOV 104 is electrically connected in parallel with the SCR 92, in order to provide surge protection therefor.

The MOV 44', MOV 46', solenoid 66' trip coils 68',70' function in a similar manner as the corresponding excessive voltage protection circuit 44, excessive voltage protection circuit 46, solenoid 66 and trip coils 68,70 of FIG. 2.

Figure 5:
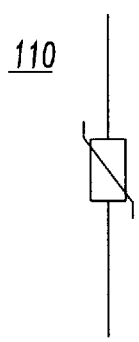
FIGS. 5–7 are excessive voltage protection circuits for the trip circuits of FIGS. 1–4 in accordance with other embodiments of the present invention.
Figure 6:
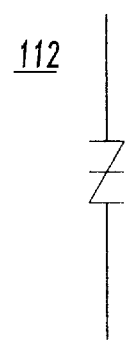
Figure 7:
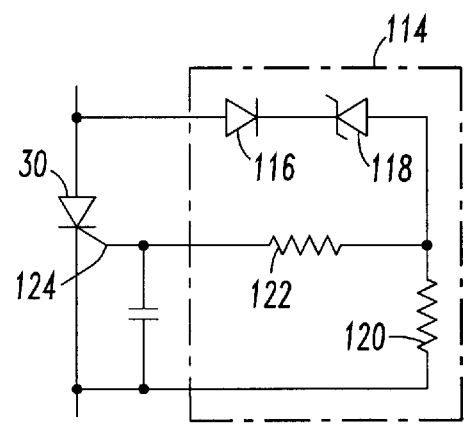

Although exemplary excessive voltage protection circuits 8,44,46,8',44',46' are shown, a wide range of alternative approaches may be employed in order to provide such protection and turn on a trip coil by a suitable mechanism when an excessive voltage condition is sensed. For example, FIG. 5 shows an MOV 110 (e.g., without limitation, having a rated voltage of about 130 $V_{RMS}$). FIG. 6 shows a sidac 112 (e.g., without limitation, having a rated voltage of about 210 $V_{peak}$), which sidac is a semiconductor device that turns on to essentially a short whenever there is an excessive voltage condition. FIG. 7 shows a circuit 114, including a diode 116, a zener diode 118, and two resistors 120,122. The zener diode 118 detects an excessive voltage condition and turns on the SCR, such as SCR 30 of FIG. 1. The SCR gate 124 is triggered by the corresponding fault detection circuit (e.g., AFCI/GFCI protection circuit 28 of FIG. 1) to energize the trip coil (e.g., trip coil 26 of FIG. 1). The series combination of the diode 116, zener diode 118 and resistor 120 is electrically connected in parallel with the SCR 30, with the resistor 122 being electrically interconnected between the SCR gate 124 and the resistor 120.

The exemplary circuit breakers 2,40,2',40' disclosed herein are advantageous in terms of both electronic loss of neutral protection and improved surge protection. This permits the trip solenoids 24,66,24',66' to block relatively high voltage surges during surge testing (e.g., allowing continued use of 7 mm line-to-neutral MOVs even with a 2 Ω surge impedance). Furthermore, such trip solenoids trip the circuit breakers if a sufficient line-to-neutral voltage of suitable duration is applied to the circuit breaker (e.g., without limitation, about 200 $V_{RMS}$ or more for about one cycle to several seconds depending on voltage).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A circuit breaker comprising:
    a line terminal adapted to receive a line voltage having a nominal voltage value and an excessive voltage value;
    a load terminal;
    at least one neutral terminal;
    separable contacts electrically connected between said line terminal and said load terminal;
    an operating mechanism for opening and closing said separable contacts; and
    a trip circuit cooperating with said operating mechanism to trip open said separable contacts, said trip circuit comprising an electromagnetic assembly including a trip coil having a threshold voltage for energization, a first circuit adapted to detect a trip condition associated with said separable contacts and to responsively energize said trip coil with said line voltage, and a second circuit adapted to detect an excessive voltage condition associated with said load terminal and said at least one neutral terminal and to responsively energize said trip coil with at least said threshold voltage.

2. The circuit breaker of claim 1 wherein said excessive voltage condition is about √3 times to about two times said nominal voltage value.

3. The circuit breaker of claim 1 wherein said nominal voltage value is about 110 $V_{RMS}$ to about 120 $V_{RMS}$; wherein the threshold voltage of said trip coil is about 60 $V_{RMS}$; wherein said excessive voltage condition is about 208 $V_{RMS}$ to about 240 $V_{RMS}$; and wherein said second circuit has a threshold voltage of about 130 $V_{RMS}$, in order to responsively energize said trip coil with a voltage greater than the threshold voltage.

4. The circuit breaker of claim 1 wherein said at least one neutral terminal is two neutral terminals.

5. The circuit breaker of claim 1 wherein said at least one neutral terminal is a neutral terminal with at least one neutral pigtail electrically connected thereto.

6. The circuit breaker of claim 1 wherein a transient protection device is electrically connected between said at least one neutral terminal and said load terminal.

7. The circuit breaker of claim 6 wherein said transient protection device is a metal oxide varistor having a rated voltage which is greater than about two times said nominal voltage value.

8. The circuit breaker of claim 1 wherein said second circuit is a metal oxide varistor.

9. The circuit breaker of claim 1 wherein said second circuit is a sidac.

10. The circuit breaker of claim 1 wherein said first circuit includes a fault detection circuit and a silicon controlled rectifier having a gate triggered by said fault detection circuit to energize said trip coil; and wherein said second circuit includes a series combination of a diode, a zener diode and a first resistor, with the series combination of said diode, said zener diode and said first resistor being electrically connected in parallel with said silicon controlled rectifier, and with a second resistor being electrically interconnected between the gate of said silicon controlled rectifier and said first resistor.

11. The circuit breaker of claim 1 wherein said first circuit includes an arc fault and ground fault detection circuit, and a silicon controlled rectifier triggered by said arc fault and ground fault detection circuit to energize said trip coil.

12. A circuit breaker comprising:
    first and second line terminals;
    first and second load terminals;
    at least one neutral terminal;
    first separable contacts electrically connected between said first line terminal and said first load terminal;
    second separable contacts electrically connected between said second line terminal and said second load terminal;

an operating mechanism for opening and closing said first and second separable contacts; and a trip circuit cooperating with said operating mechanism to trip open said first and second separable contacts, said trip circuit comprising an electromagnetic assembly including a first trip coil, a second trip coil, a first circuit adapted to detect a trip condition associated with at least one of said first and second separable contacts and to responsively energize said first and second trip coils, a second circuit adapted to detect an excessive voltage condition associated with said first load terminal and said at least one neutral terminal and to responsively energize said first trip coil, and a third circuit adapted to detect an excessive voltage condition associated with said second load terminal and said at least one neutral terminal and to responsively energize said second trip coil.

13. The circuit breaker of claim 12 wherein said at least one neutral terminal is two neutral terminals.

14. The circuit breaker of claim 12 wherein said at least one neutral terminal is a neutral terminal with at least one neutral pigtail electrically connected thereto.

15. The circuit breaker of claim 12 wherein a first transient protection device is electrically connected between said at least one neutral terminal and said first load terminal; and wherein a second transient protection device is electrically connected between said at least one neutral terminal and said second load terminal.

16. The circuit breaker of claim 15 wherein said first and second transient protection devices are metal oxide varistors.

17. The circuit breaker of claim 12 wherein at least one of said second and third circuits is a metal oxide varistor.

18. The circuit breaker of claim 12 wherein at least one of said second and third circuits is a sidac.

19. The circuit breaker of claim 12 wherein said first circuit includes a fault detection circuit, three pairs of first and second diodes, and a silicon controlled rectifier having an anode, a cathode and a gate triggered by said fault detection circuit, with each of said first and second diodes having an anode and a cathode, with the anodes of said first diodes being electrically connected to define a first node, with the cathodes of said second diodes being electrically connected to define a second node, with said three pairs of diodes defining a third node, a fourth node and a fifth node, respectively; wherein said first trip coil is electrically connected between said first load terminal and a first one of said third, fourth and fifth nodes; wherein said second trip coil is electrically connected between said second load terminal and a second one of said third, fourth and fifth nodes; wherein said at least one neutral terminal is electrically interconnected with a third one of said third, fourth and fifth nodes; wherein said second circuit is electrically connected between said at least one neutral terminal and said first one of said third, fourth and fifth nodes; and wherein said third circuit is electrically connected between said at least one neutral terminal and said second one of said third, fourth and fifth nodes.

20. The circuit breaker of claim 12 wherein said first circuit includes a ground fault detection circuit, and a silicon controlled rectifier triggered by said ground fault detection circuit to energize said first and second trip coils.

* * * * *